April 27, 1937.    H. FORD    2,078,376
ELECTRIC GENERATOR CONSTRUCTION
Filed July 1, 1935
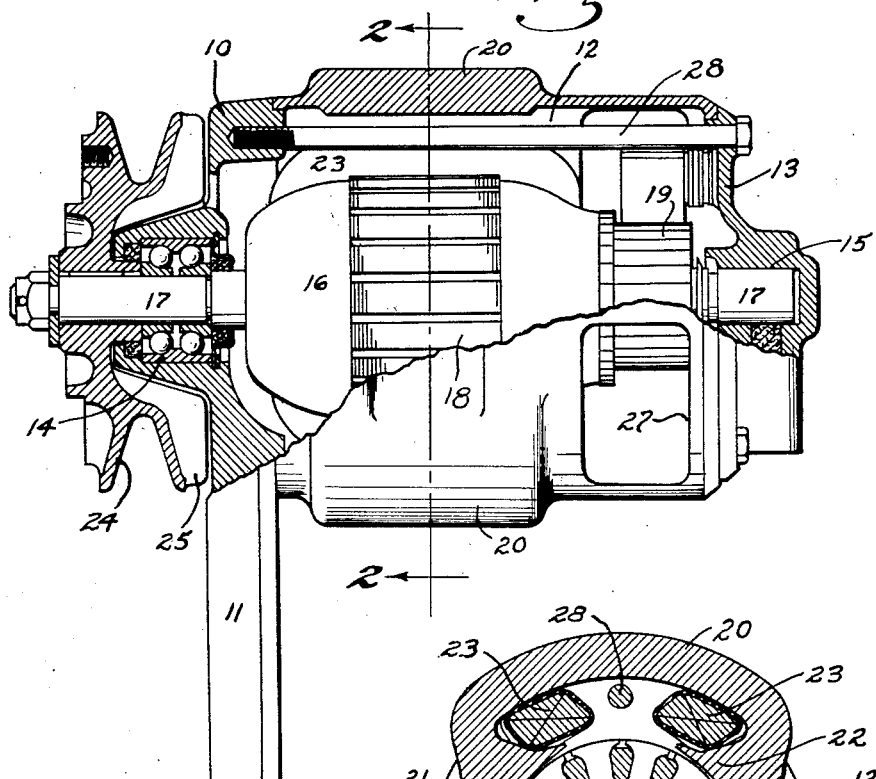
Fig. 1.
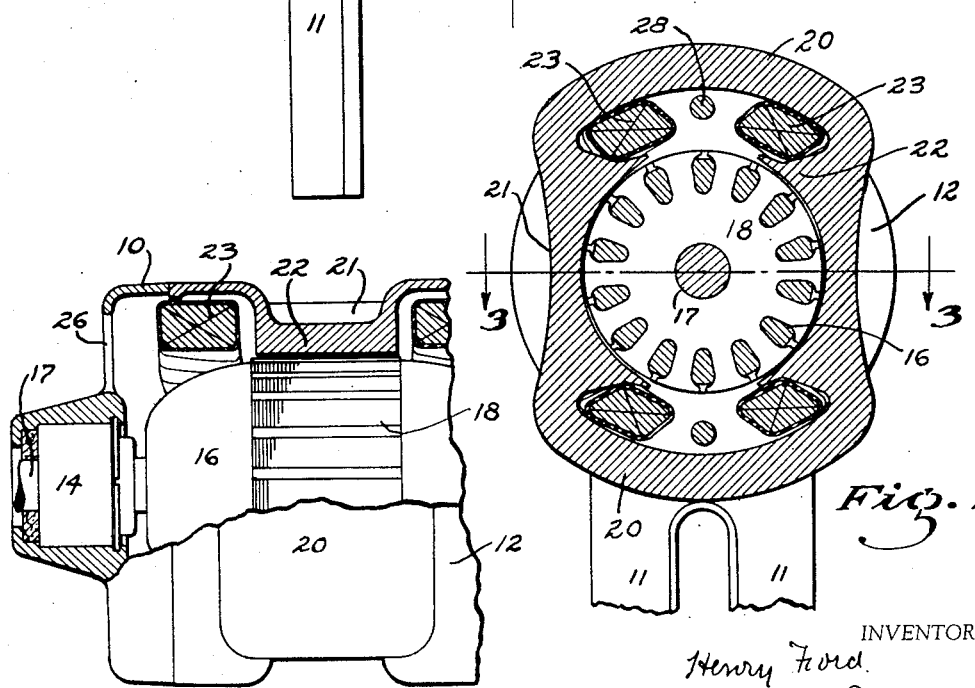
Fig. 2.
Fig. 3.
INVENTOR.
Henry Ford.
BY
ATTORNEY.
W. Edwin C. McRae Patented Apr. 27, 1937

2,078,376

UNITED STATES PATENT OFFICE 2,078,376

ELECTRIC GENERATOR CONSTRUCTION

Henry Ford, Dearborn, Mich., assignor to Ford Motor Company, Dearborn, Mich., a corporation of Delaware Application July 1, 1935, Serial No. 29,195

5 Claims. (Cl. 171—252)

The object of my invention is to provide an electric generator especially suitable for use in connection with automobile engines.

Specifically, the object of my invention is to provide a generator having a novel field construction, which field is cast as a unit with the pole pieces and generator frame to thereby eliminate a material portion of the cost heretofore inherent in manufacturing generators for this purpose.

In the past, it has been customary in automobile generator construction to provide a cylindrical steel frame which extends the length of the generator, this frame being closed at one end with a generator head and at the other end with a brush supporting plate. The armature is rotatably mounted in suitable bearings in these two members. Detachable pole pieces project inwardly from the frame in substantial alignment with the laminations of the armature, the field windings being disposed around these pole pieces. The disadvantage of such structure is that the tubular frame must be quite thick in order to form an efficient field, which thick portion need, for generation purposes, extend only the length of the armature laminations. However, for commercial reasons the frame tube has always been formed with a uniform wall thickness, and as the frame is usually three to four times the length of the laminated portion of the armature, excessive weight results from this construction. Furthermore, the joints between the pole pieces and the frame materially reduce the efficiency of the generator by lowering the flux density of the field.

In my improved construction the pole pieces are cast integrally with the field structure so that greater efficiency results. Furthermore, the field structure is formed having a thickness considerably thicker than is permissible where a frame of uniform thickness is provided. That portion of the frame of my improved device which is used only as a housing is cast with a very thin wall thickness because it is only necessary that this portion have sufficient structural strength to rotatably support the armature. The result of this construction is that a more efficient generator results with a decrease in weight.

A further object of my invention is to provide a generator having a field circuit of minimum length to thereby increase the efficiency of the generator.

With these and other objects in view my invention consists in the arrangement, construction and combination of the various parts of my improved device, as described in the specification, claimed in my claims, and illustrated in the accompanying drawing, in which:

Figure 1 is a longitudinal central sectional view, taken through my improved generator.

Figure 2 is a sectional view, taken on the line 2—2 of Figure 1, and

Figure 3 is a sectional view, taken on the line 3—3 of Figure 2.

Referring to the accompanying drawing, I have used the reference numeral 10 to illustrate a generator head having a supporting bracket extending therefrom, the supporting bracket being formed as a pair of parallel arms 11 which extend downwardly from the lower side of the head 10. The head 10 and arms 11 are formed as an integral casting, the two arms being adapted to be secured in a vertical position on the associated engine by means of a bolt which extends between the arms. A tubular frame 12 extends substantially the length of the generator, one end of said frame being secured to the head 10 while the other end is closed by means of a plate 13. A pair of bolts 28 extend through the plate 13, frame 12 and into the head 10 to secure the parts together.

The head 10 is provided with a ball bearing unit 14 therein while a plain bearing 15 is provided in the plate 13 in axial alignment therewith. An armature 16 is fixed upon a shaft 17, which shaft is rotatably mounted within the frame 12 upon the bearings 14 and 15. It will be noted from Figure 1 that approximately one third of the length of the armature consists of laminations 18 and that a commutator 19 is secured on the shaft 17 adjacent to one end of the armature. That portion of the frame which encloses the commutator 19 and all of the armature with the exception of the laminations 18 is cast with a comparatively thin wall, while that portion 20 of the frame which surrounds the laminations 18 is cast having a wall thickness of about four times the thickness of the remainder of the frame. The shape of this thick portion 20 is such that a cross section therethrough forms a field circuit having a figure 8 shape. In order to form this novel shaped field, a pair of diametrically opposed depressions 21 extend inwardly from the sides of the thick portion 20, and pole pieces 22 are cast integrally with and extend inwardly from the frame adjacent to the depressions 21. The pole pieces 22 are aligned with the armature laminations 18 in the conventional manner. A field coil 23 is disposed around each of the pole pieces 22, which coils are bent into an arcuate shape so as to closely fit the periphery of the frame 12.

In order to drive the generator, I have provided a V-belt pulley 24 which is keyed to the shaft 17 just outside of the head 10. This pulley is provided with a plurality of radially extending vanes 25 which are cast on the face thereof adjacent to the head 10. The head 10 is provided with a plurality of sector shaped openings 26 therethrough in position adjacent to the vanes 25, while four relatively large openings 27 extend through the frame 12 in substantial alignment with the commutator 19. Rotation of the pulley 24 therefore not only rotates the armature 16 but also draws air through the openings 27 and forwardly around the field coils 23 and through the openings 26 where it is discharged radially by the vanes 25. Adequate cooling of the generator is thereby effected.

Among the many advantages arising from the use of my improved generator, it should be mentioned that a reduction in the amount of iron is obtained while the amount of iron used in the field structure is greater than formerly used. Furthermore, a minimum length of magnetic field circuit is provided which reduced length could not heretofore be obtained in a generator of the conventional type.

A commercial advantage is obtained with this structure for the reason that the entire frame and magnetic field may be finished by simply machining each end of the frame and the inner ends of the pole pieces. The elimination of the joint heretofore provided between the pole pieces and the frame also increases the electrical efficiency of the generator.

Some changes may be made in the arrangement, construction and combination of the various parts of my improved device without departing from the spirit of my invention and it is my intention to cover by my claims such changes as may reasonably be included within the scope thereof.

I claim as my invention:

1. A generator comprising, a tubular frame, an armature, a commutator fixed to one end of said armature, said commutator and armature being rotatably mounted within said frame, that portion of the frame which encloses the commutator having a relatively thin wall section of circular shape while that portion which surrounds the armature is of rectangular shape having a relatively thick wall section, and pole pieces extending inwardly from the center portion of the sides of said rectangle, said pole pieces and frame and armature forming a substantially figure 8 shaped magnetic field.

2. A generator comprising, a cast tubular frame, an armature having a laminated portion extending substantially one-third of its length, a commutator fixed to one end of said armature for rotation therewith, said armature and commutator being rotatably mounted within said frame, said frame having a relatively thin circular wall section over all of its length with the exception of that portion which encloses the laminated section of the armature, said excepted portion having a thick wall section of rectangular shape, and pole pieces cast integrally with and extending inwardly from the center portion of the sides of said rectangle, said pole pieces and frame and armature forming a substantially figure 8 shaped magnetic field.

3. A generator comprising, a tubular frame having a head secured over each end thereof, an armature shaft rotatably mounted in suitable bearings in said heads, an armature fixed on said shaft, said armature having a laminated portion which extends about one-third of its length, a commutator fixed on said shaft, said armature and commutator being disposed within said frame, said frame having a relatively thin wall of circular shape over all of its length with the exception of that which surrounds the laminations of said armature and said frame having a thick section of rectangular shape which extends over said laminations, said rectangular section having each side depressed at the center to form pole pieces integrally with said frame, which pole pieces coact with said armature so as to form a substantially figure 8 shaped magnetic field.

4. A generator comprising, a cast tubular frame having one end thereof formed as a thin walled cylindrical tube and with the other end formed as a rectangle having a thick wall section, an armature, a commutator fixed to said armature, said armature and commutator being rotatably mounted within said frame, said armature being aligned with said rectangular portion of the frame while said commutator is aligned with the circular portion of said frame, pole pieces cast integrally with said thick wall section which extend inwardly from the center portions of the sides of said frame to a position adjacent to said armature so as to form a substantially figure 8 shaped magnetic field, the circular portion of said frame having openings therein aligned with said commutator, and means for drawing air through said opening and lengthwise between the frame and said armature to thereby cool the generator.

5. A generator comprising, a frame cast in such shape that substantially one-half of its length is formed as a thin walled circular tube with the remaining portion of said frame being formed as a rectangular shaped tube having relatively a thick wall, the width of said rectangle being materially less than the diameter of said circular portion while the longer side of said rectangle is materially greater than the diameter of said circular portion, an armature having a laminated portion extending substantially one-third of its length, a commutator fixed to one end of said armature for rotation therewith, said armature and commutator being rotatably mounted within said frame in such position that the laminations are aligned with the rectangular shaped portion of the frame while said commutator is aligned with the circular shaped portion, pole pieces extending inwardly from the sides of said rectangle, said armature coacting with said pole pieces to form a substantially figure 8 shaped magnetic field circuit, and a field coil disposed around each of said pole pieces, said coil projecting lengthwise through the rectangular portion of said frame into the circular portion thereof, whereby a relatively light weight construction having a short magnetic field circuit of large cross section is provided.

HENRY FORD.